United States Patent [19]

Dietz et al.

[11] Patent Number: 4,939,193

[45] Date of Patent: Jul. 3, 1990

[54] USE OF THE ALPHA-MODIFICATION OF CIS-NAPHTHOYLENEBIS(BEN-ZIMIDAZOLE) FOR PIGMENTING POLYOLEFINS

[75] Inventors: Erwin Dietz, Frankfurt am Main; Siegfried Schiessler, Bad Soden am Taunus, both of Fed. Rep. of Germany

[73] Assignee: Hoechst Aktiengesellschaft, Frankfurt am Main, Fed. Rep. of Germany

[21] Appl. No.: 254,363

[22] Filed: Oct. 6, 1988

[30] Foreign Application Priority Data

Oct. 10, 1987 [DE] Fed. Rep. of Germany ....... 3734385

[51] Int. Cl.$^5$ .......................... C08J 3/22; C08K 5/34; C08L 23/02
[52] U.S. Cl. ...................................... 524/90; 524/487; 524/528; 524/570; 524/583; 524/585
[58] Field of Search ........................................... 524/90

[56] References Cited

U.S. PATENT DOCUMENTS 3,772,303 11/1973 Spietschka et al. .
3,865,829 2/1975 Wagner .
4,181,805 1/1980 Landler .

OTHER PUBLICATIONS

Grant *Hackh's Chemical Dictionary*, 4th Edition, pp. 27 and 472, McGraw-Hill, NY, 1972.

Primary Examiner—C. Warren Ivy

[57] ABSTRACT

The α-modification of cis-naphthoylenebis(benzimidazole) is unstable in many media and up to date has therefore only been used as a vat dye. However, according to the invention, the α-modification can readily be used for pigmenting in the mass polyolefins such as polyethylene, polypropylene or analogous copolymers. During pigmenting, the pigment which is prepared in a conventional manner, is stable in that modification and produces strong red dyeings.

9 Claims, 1 Drawing Sheet

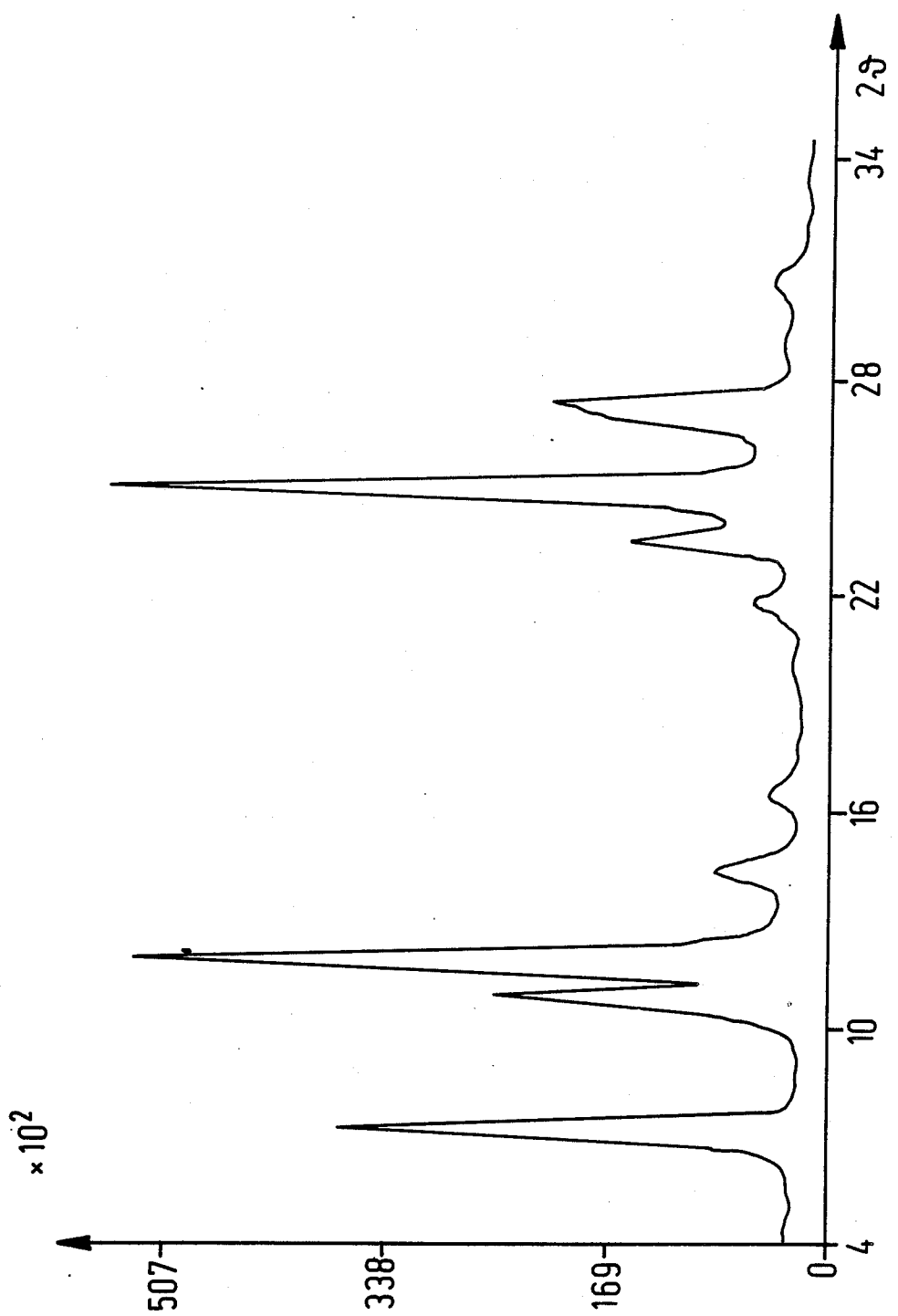

USE OF THE ALPHA-MODIFICATION OF CIS-NAPHTHOYLENEBIS(BENZIMIDAZOLE) FOR PIGMENTING POLYOLEFINS

The reaction of naphthalene-1,4,5,8-tetracarboxylic acid with 1,2-diaminobenzene necessarily produces, in addition to the trans isomer of naphthoylenebis(benzimidazole) also the cis isomer of the formula (I)

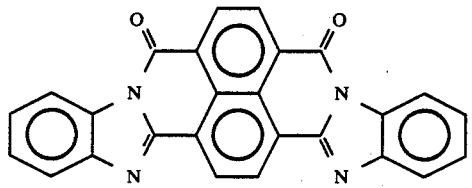

While the trans isomer is of very great importance not only as a pigment (C.I. Pigment Orange 43) but also as a vat dye (C.I. Vat Orange 7), the cis isomer (C.I. Vat Red 15) is of less economic importance. In the conventional separation processes of the isomers, the cis isomer is obtained in the form of a solution of its potassium hydroxide adduct in aqueous potassium hydroxide solution and is precipitated from the solution by the addition of acid and is isolated. As described in DE-A-2,039,465 (US-A 3,772,303), it is present in the extremely unstable phase of the α-modification, which up to date has therefore only been used as a vat dye. As is known from DE-A 2,039,465 (US-A-3,772,303), the α-modification is converted to the more stable phase, the β-modification, not only by the action of organic solvents, but also by heating in water. The instability of the α-modification can also be noticed during heating in paraffin oil. Thus, the rearrangement into the β-modification already begins at 100° C and, even upon heating at 200° C for a short time, extensive conversion to the β-modification takes place. A pigment having an unstable phase and in which a change in modification takes place during the processing usually leads to a shift in hue, to losses in color strength and to the formation of dull dyeings. For the pigmenting of polyolefins in the mass, processing temperatures of 200 to 270° C are usually necessary. Since high temperatures generally increase the rate of phase transitions, the use of the unstable phase of the α-modification as a pigment for pigmenting polyolefins does not seem appropriate nor has such a use hitherto been recommended or become known. Even in the case of DE-A-2,809,877 (US-A-4,181,805), which describes inter alia, in Examples 6 and 7, the pigmenting of polyolefins using the compound of the formula (I), it is clearly evident that the β-modification and not the α-modification of compound (I) is used. According to this publication, the β-modification is obtained by a solvent finishing process using chlorobenzene as the solvent.

It has now been found that, surprisingly, the α-modification of the cis isomer can be used for pigmenting polyolefins at the temperatures of 200 to 270° C, which are customarily applied in practice, without a phase transition into the yellowish/red β-modification taking place The invention relates to the use of the α-modification of cis-naphthoylenebis(benzimidazole) for pigmenting polyolefins.

Strong red dyeings having high light-fastness properties are obtained, the dyeings being heat-resistant under the conditions applied which are customary in practice for the particular polyolefins.

Example of polyolefins (i.e. polyalkenes) which are suitable for the use according to the invention are polyethylene, polypropylene, polybut-1-ene, copolymers of ethene and propene and also copolymers of ethene or propene or ethene and propene having minor contents of at least one further polymerizable olefin (i.e. alkene). Mixtures of at least two of the above polyolefins are also suitable. Preferred polyolefins are HD-polyethylene, LD-polyethylene and polyproplene, in particular polypropylene for spin-dyeing. Thus, the α-modification is heat-resistant in polypropylene up to 290° C under standardized test conditions (DIN 53,772). In polyethylene, which is processed in practice at 200 to 250° C, the α-modification is heat-resistant up to 270° C.

The polyolefins to be pigmented can additionally contain customary auxiliaries, for example stabilizers such as antioxidants and UV stabilizers, fillers and colorants, such as other pigments, in particular white pigments.

The α-modification of the cis isomers of the formula (I) is characterized by an X-ray diffraction spectrum which, if Cu-$K_\alpha$ radiation is used, has reflections at the following 2 Bragg angles (cf. accompanying FIGURE):

7.20 (65); 10.90 (45); 11.90 (95); 14.30 (10); 23.55 (25); 25.0 (100) and 27.35 (35); the numbers in parentheses in each case give the relative intensity of the reflections in percent.

The α-modification of (I) can be prepared by methods which are customary per se. For example, it can be prepared by the process described in DE-A-2,809,877 (US-A 4,181,805), which produces a particularly pure pigment. In this process, the potassium hydroxide adduct of (I) dissolved in concentrated potassium hydroxide solution is salted out with sodium hydroxide, and the isolated product is subsequently hydrolyzed to the α-modification of (I) by stirring it into water. Preferably, preparation is carried out analogously to the process described in German Auslegeschrift No. 1,569,736 (US-A 3,865,829), in which the mixture of isomers formed in the reaction of naphthalene-1,4,5,8-tetracarboxylic acid with 1,2-diaminobenzene is first reacted in ethanolic potassium hydroxide solution to give the potassium hydroxide adducts of the isomers, the sparingly soluble adduct of the trans isomer is removed at a low temperature, and the α-modification of (I) is precipitated out from the solution of the adduct of (I) by adding acid after distilling off the ethanol. Preferably, the process is carried out in such a manner that the dissolved adduct is hydrolyzed by decreasing the potassium hydroxide concentration the solution by the addition of acid at 50–100° C, in particular at 60 to 80° C, and the α-modification of (I) is filtered off from the still alkaline suspension while hot, is then washed with hot alkali and also with hot water and is subsequently dried. Particularly easily dispersible pigments are obtained in in this process by adding the acid as quick as possible.

The α-modification of (I) used for the pigmenting of polyolefins can be not only the 100% strength cis isomer but also mixtures of the cis isomer with a limited amount of the trans isomer. The amount of the trans isomer should be small enough, so that incorporation of the trans isomer into the crystal lattice of the cis isomer of the α-modification still takes place to a large extent.

Since the complete removal of the trans isomer is economically very expensive in the context of the separation of the isomers, due to the residual solubility of the potassium hydroxide adduct of the trans isomer in ethanolic potassium hydroxide solution, the use of the 100% strength cis compound is generally avoided. However, the thermal stability of the α-modification of the cis isomer in polyolefins is hardly influenced, or not at all, by the amount of trans isomer contained therein. The amount of trans isomer can be about 20% by weight at most. Preferably, the amount of trans isomer is 3 to 15% by weight, in particular 3 to 10% by weight.

The pigmenting of polyolefins using the α-modification of (I) is preferably carried out in the manner customary in practice by first preparing a pigment preparation which is generally 40 to 50% in strength from the pigment, the polyolefin and a polyolefin wax. This can be done, for example, by mixing the components in a high-speed mixer followed by kneading in a twin-screw extruder and further processing to give highly pigmented granules. The polyolefin wax has a lower degree of polymerization than the polyolefin and can be of the same type, i.e. can be synthesized from the same monomers as the polyolefin, or can be of a different type. Preferably, the polyolefin wax is of the same type as the polyolefin. Formulations for polypropylene spin-dyeing generally consist of 30 to 40% of pigment, 10 to 40% of polypropylene wax and 20 to 60% of polypropylene. The dyeing of polyolefins using the pigment formulation is carried out in the manner customary in practice by melting the polyolefin at about 200 to 270° C and adding the pigment formulation, followed by processing. The optimum processing temperature is generally somewhat lower for polyethylene than for polypropylene.

The advantage of using the bluish-red α-modification of (I) compared to the yellowish-red β-modification previously solely used in the pigmenting of polyolefins is, on the one hand, the lower economic expense. Thus, the phase transition from the α-modification to the β-modification usually requires the use of aromatic solvents such as chlorobenzene. The use of such solvents is not necessary if the α-modification is prepared. On the other hand, ecological and toxicological problems which have to be solved in the handling and recycling of such materials also do not arise. Together with phase transition, increase in particle size takes place in the known process, leading to a lower color strength In the use according to the invention, an increase in particle size is avoided and an optimum color strength is achieved.

The α-modification of (I) can be used as a pigment advantageously in all polyolefins and formulations containing polyolefins in which no change in the modification of the pigment takes place. Preferably, it can be used for the pigmenting of polyolefins in the mass, in which process the polyolefin compositions can be processed in a conventional manner to give granules, extrudates, such as bars, sheets or hollow bodies, injection moldings or staple fibers. Preferably, the α-modification of (I) is used in the spin-dyeing of polypropylene.

In the examples which follow, parts and percent are by weight.

EXAMPLES (1a) Preparation of the α-modification of the pigment (I): After conventional reaction of naphthalene-1,4,5,8tetracarboxylic acid with 1,2-diaminobenzene, followed by reaction with ethanolic potassium hydroxide solution and removal of the sparingly soluble potassium hydroxide adduct of trans-naphthoylenebis(benzimidazole) (C.I. Pigment Orange 43) at 30-35° C, a solution of the potassium hydroxide adducts of 173 parts of the cis compound according to formula (I) and 15 parts of the trans compound (C.I. Pigment Orange 43) in ethanolic potassium hydroxide solution, consisting of 595 parts of KOH, 2800 parts of ethanol and 805 parts of water, is obtained. While adding 500 parts of water at the same time, the ethanol is distilled off. After further addition of water, the solution of the potassium hydroxide adducts is clarified while hot, and the residue is washed with 500 parts of 25% strength aqueous potassium hydroxide solution. 856 parts of 31% strength hydrochloric acid are run into the combined filtrate at 70 to 80° C over a period of 10 minutes. After stirring has been continued for one hour at 70 to 80° C, the alkaline suspension is filtered The filter cake is first washed with dilute aqueous potassium hydroxide solution and then washed until neutral with hot water. After drying at 80° C, the pigment is ground in an impact jet mill. This gives 181 parts of the α-modification of cis-naphthoylenebis(benzimidazole), containing about 8% of the trans isomer (C.I. Pigment Orange 43). The accompanying FIGURE shows the X-ray diffraction spectrum of this pigment, measured with a D 500 diffractometer from Siemens using Cu-K$^\alpha$ radiation; on the spectrum, the measured X-ray intensities (counting rate) of the reflections are reproduced as a function of the 2¼ Bragg angle.

In the pigmenting of polyolefins in the manner customary in practice, the pigment produces strong red colorations having a light-fastness of 7 to 8 at 1% pigmenting. The pigment is highly dispersible in polyolefins and has very good heat-resistance In polypropylene, it is thermally stable up to 290° C as specified in DIN 53 772 and, even at 300° C, it shows no change of hue to the yellowish-red region, which is characteristic for the rearrangement into the β-modification. In polyethylene, the pigment is thermally stable up to 270° C and shows a shift in hue to a yellowish-red hue above 280° C.

(1b) Preparation of a polyethylene pigment formulation:

40 parts of the ground pigment obtained according to Example (1a) and 60 parts of a mixture of polyethylene wax and polyethylene are mixed in a mixer, then dispersed at 170° C in a twin-screw extruder and subsequently processed to give granules.

(1c) Polyethylene pigmenting:

1.25 parts of the pigment formulation obtained according to Example (1b) and 98.75 parts of polyethylene are mixed in a mixer and processed at 230° C in an injection-molding apparatus to give moldings.

(2a) Preparation of pigment (I) in the α-modification:

Analogously to Example (1a), reaction of naphthalene-1,4,5,8-tetracarboxylic acid with 1,2-diaminobenzene, followed by reaction with ethanolic potassium hydroxide solution and removal of the main portion of the sparingly soluble potassium hydroxide adduct of trans-naphthoylenebis(benzimidazole) (C.I. Pigment Orange 43) at 15-20° C gives a solution of the potassium hydroxide adducts of 182 parts of cis-naphthoylenebis(benzimidazole) and 6 parts of the corresponding trans compound in ethanolic potassium hydroxide solution, consisting of 595 parts of potassium hydroxide, 2800 parts of ethanol and 805 parts of water. After distilling off the ethanol, while adding 500 parts of water at the same time, water is again added to the solution, the mixture is heated and filtered while hot. The residue is washed with 500 parts of 25% strength aqueous potassium hydroxide solution, and 856 parts of 31% strength hydrochloric acid are added to the combined filtrate at 60-70° C over a period of 12 minutes. After stirring for one hour at 60 to 70° C, the alkaline suspension is filtered, and the filter cake is washed with dilute aqueous potassium hydroxide solution, washed until neutral with hot water, dried at 80° C and ground in an impact jet mill. This gives 182 parts of the α-modification of cis-naphthoylenebis(benzimidazole), which contains about 3% of the corresponding trans compound. The pigment obtained corresponds in its coloristic properties to that of Example (1a).

(2b) Preparation of a polypropylene pigment formulation:

40 parts of the ground pigment obtained according to Example (2a) and 60 parts of a mixture of polypropylene wax and polypropylene are mixed in a mixer, then dispersed at 200° C in a twin-screw extruder and subsequently processed to give granules.

(2c) Spin-dyeing of polypropylene:

2.5 parts of the pigment formulation obtained according to Example (2b) and 97.5 parts of isotactic polypropylene, fiber type, are melted at 270° C in a spinning extruder and spun into fibers.

(3) Example (1a) is repeated, except that, instead of the solution of the potassium hydroxide adduct of cis and trans isomers, a solution of the potassium hydroxide adducts of 188 parts of the pure cis isomer of naphthoylenebis(benzimidazole) in ethanolic potassium hydroxide solution of the composition mentioned is used, and the mixture is worked up analogously to Example 1a to give a cis-naphthoylenebis(benzimidazole) of the α-modification which in its coloristic properties corresponds to the pigment from Example (1a).

(4) Example (1a) is repeated, except that, instead of the solution of the potassium hydroxide adducts of 173 parts of the cis isomer and 15 parts of the trans isomer of naphthoylenebis(benzimidazole), a solution of 160 parts of the cis isomer and 28 parts of the trans isomer of naphthoylenebis(benzimidazole) in ethanolic potassium hydroxide solution of the composition mentioned is used, and the mixture is worked up analogously to Example 1a to give a pigment of the cis isomer in the α-modification containing about 15% of the trans isomer. The pigment largely corresponds in its coloristic properties to those of the pigment obtained according to Example (1a).

We claim:

1. A pigmented polyalkene mass comprising a single polyalkene or a mixture of at least two polyalkenes from the group consisting of polyethylene, polypropylene, a copolymer of ethene and propene, and a copolymer of ethene or propene or of ethene and propene having, respectively, a minor content of at least one further polymerizable alkene, wherein the polyalkene mass has been mass-colored by treatment in a melt with a pre-mixed pigmented formulation consisting essentially of:
   a pigment consisting essentially of an α-modification of cis-naphthoylene-bis-benzimidazole and, if a residual amount of the corresponding trans-isomer is present, up to 20% by weight of the corresponding trans-isomer, mixed with
   a second polyalkene and a low-molecular weight polyalkene wax.

2. A pigmented polyalkene mass as claimed in claim 1, wherein said second polyalkene and said low-molecular weight polyalkene wax are both the same polyalkene and are the same polyalkene as the polyalkene of the pigmented polyalkene mass.

3. A pigmented polyalkene mass as claimed in claim 1, wherein the polyalkene is a polypropylene for spinning compositions.

4. A pigmented polyalkene mass as claimed in claim 1, wherein the polyalkene is a polyethylene, a polypropylene, a copolymer of ethene and propene or a mixture of at least two of these polyalkenes.

5. A pigmented polyalkene mass as claimed in claim 1, wherein said trans-isomer is present in the pigment of said pigmented formulation in an amount ranging from 3 to 10% by weight.

6. A pigmented polyalkene mass as claimed in claim 1, wherein said α-modification of cis-naphthoylene-bis-benzimidazole has been precipitated from a solution of its potassium hydroxide adduct in concentrated aqueous potassium hydroxide solution at 60-80° C by the rapid addition of an amount of acid insufficient for neutralization and has subsequently been isolated.

7. A pigmented polyalkene mass as claimed in claim 1, wherein the pigmented polyalkene mass has been mass-colored by:
   first mixing the α-modification of cis-naphthoylenebis (benzimidazole) with the second polyalkene and a polyalkene wax and kneading the resulting mixture to obtain said pre-mixed pigmented formulation, then
   mixing the resulting pre-mixed pigmented formulation with a molten polyalkene and subsequently granulating, extruding or injection-molding the mixture or processing it to obtain staple fibers.

8. A pigmented polyalkene mass as claimed in claim 7, wherein said pre-mixed pigment formulation has been mixed at 200 to 270° C with molten polyethylene, or at 200 to 290° C with molten polypropylene, and then is kneaded.

9. A pigmented polyalkene mass of claim 1 wherein the pre-mixed pigmented formulation contains 30 to 50% pigment prior to incorporation into the melt.

* * * * *